United States Patent Office 3,557,137
Patented Jan. 19, 1971

3,557,137
TRIAZOLE COMPOUNDS
Kurt T. J. Skagius and Eva B. Åkerblom, Uppsala, Sweden, assignors to Pharmacia Aktiebolag, Uppsala, Sweden, a corporation of Sweden
No Drawing. Continuation-in-part of application Ser. No. 432,412, Feb. 12, 1965. This application Aug. 20, 1968, Ser. No. 753,883
Int. Cl. C07d 55/06
U.S. Cl. 260—308                                 10 Claims

ABSTRACT OF THE DISCLOSURE

This invention relates to novel compounds of the formula

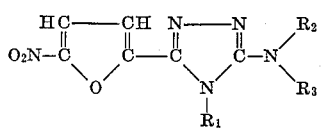

wherein $R_1$ represents lower alkyl; $R_2$ is hydrogen or a lower alkyl; $R_3$ is hydrogen or a lower alkyl or a radical of the formula —$COR_4$, (wherein $R_4$ is hydrogen or an alkyl containing from 1 to 3 carbon atoms, or a halogen-substituted alkyl containing from 1 to 3 carbon atoms). It also relates to therapeutically useful salts of these compounds and the disclosed methods of preparing such compounds. The novel compounds are useful as infection combatting agents, and especially useful as urinary tract antiseptics.

CROSS-REFERENCE TO RELATED CASE

Reference is made to our prior copending application Ser. No. 432,412 filed Feb. 12, 1965 and now abandoned, of which this is a continuation-in-part application.

THE PRESENT INVENTION

This invention relates to novel compounds of the formula

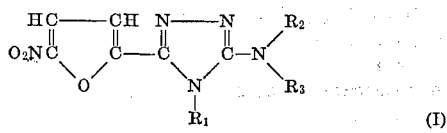

wherein $R_1$ represents lower alkyl; $R_2$ is hydrogen or a lower alkyl; $R_3$ is hydrogen or a lower alkyl or a radical of the formula —$COR_4$ (wherein $R_4$ is hydrogen or an alkyl containing from 1 to 3 carbon atoms, or a halogen-substituted alkyl containing from 1 to 3 carbon atoms).

As alkyl groups in the compounds of the above Formula I may be mentioned the following: methyl, ethyl, n-propyl, and isopropyl.

As acyl groups in the compounds of the above Formula I may be mentioned: formyl, acetyl, propionyl, chloroacetyl, dichloroacetyl, 2 - chloropropionyl, and bromoacetyl.

When at least one of the radicals $R_2$ and $R_3$ is hydrogen, the compounds of the above Formula I may exist in their tautomeric forms. The present invention also encompasses corresponding compounds when being in these forms.

Examples of specific compounds that are contemplated by this invention would include:

(1) 3-amino-4-methyl-5-(5-nitro-2-furyl)1,2,4-triazole
(2) 3-acetylamino-4-methyl-5-(5-nitro-2-furyl)-1,2,4-triazole
(3) 4-ethyl-3-ethylamino-5-(5-nitro-2-furyl)1,2,4-triazole

PREPARATION OF THE NOVEL COMPOUNDS

It is a particular feature of this invention that the compounds of the Formula I can be prepared in facile manner from readily available starting compounds, namely compounds of the Formula II

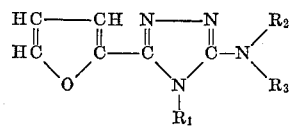

wherein $R_1$, $R_2$ and $R_3$ are the same as specified with regard to Formula I. According to the invention, a compound of the Formula II is treated with a nitrating agent and the compound thus formed is, if desired, reacted with a base or, if it does not contain an acyl group, with an acid to produce the corresponding therapeutically useful salt. When the compound of the Formula I contains an acyl group, the latter may be split off by hydrolysis.

As a nitrating agent may be mentioned mixtures of concentrated nitric acid with concentrated sulphuric acid or concentrated acetic acid as dehydrating agents.

The compounds of Formula II may readily be obtained by ring closure of 2-furoylaminoguanidines and, if desired, subsequent acylation of the products obtained.

The ring closure can be effected either by heating or treating the 2-furoylaminoguanidine under basic conditions, especially in aqueous solution containing an alkaline reacting substance.

In the nitration of the compounds of the Formula II, it is frequently valuable to use the acylated intermediates and, if desired, remove the acyl group by hydrolysis. The presence of an acyl group will as a rule increase the yield and give a purer product.

As examples of acylating agents may be mentioned anhydrides and halides of acids having the formula

$R_4COOH$ wherein $R_4CO$ represents the acyl group to be introduced.

As examples of hydrolysing agents may be mentioned inorganic acids such as hydrochloric and sulphuric acids. The hydrolysing reaction may be carried out in the presence of organic solvents, such as lower alkanols, ketones, acids, and ethers. It may be carried out with or without isolation of the nitrated acyl-derivatives.

EXAMPLE I (a) Preparation of 2-methyl-1-furoylaminoguanidine

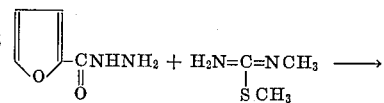

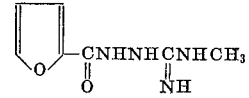

1 mole of furoylhydrazine and 1 mole of N-methyl-S-methylisothiourea hydroiodide were dissolved in 50 ml. of water and 500 ml. of 2 M sodium hydroxide. Reaction occurred at room temperature with formation of a precipitate of 2-methyl-1-furoylaminoguanidine. A reaction time of about 120 hours was necessary to get a yield of 90%. M.P. 150–153° C. (decomp.) (Found (percent): C, 45.9; H, 5.9; N, 30.4. Calc. for $C_7H_{10}N_4O_2$ (182.1) (percent): C, 46.2; H, 5.5; N, 30.8.)

(b) Preparation of 3-amino-5-(2-furyl)-4-methyl-1,2,4-triazole

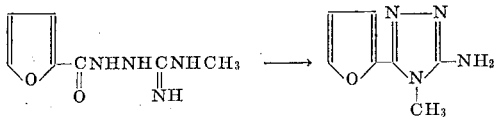

24.6 g. (0.135 mole) of 2-methyl-1-furoylaminoguanidine was dissolved in dimethylformamide and the solution was boiled for 1 hour. By cooling, 10.7 g. of 3-amino-5-(2-furyl)-4-methyl-1,2,4-triazole precipitated. M.P. 240.5–243, 5° C. The mother liquor was evaporated and the residue was treated with 30 ml. of 2 M sodium hydroxide leaving a further 1.5 g. of the same product. (Found (percent): C, 51.3; H, 5.1; N, 34.0. Calc. for $C_7H_8N_4O$ (164.1) (percent): C, 51.2; H, 4.9; N, 34.1.)

By neutralization of the alkaline solution 6 g. of 5-(2-furyl)-3-methylamino-1,2,4-triazole precipitated.

(c) Preparation of 3-acetylamino-5-(2-furyl)-4-methyl-1,2,4-triazole

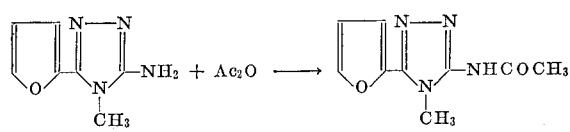

19 g. of 3-amino-5-(2-furyl)-4-methyl-1,2,4-triazole was boiled with 50 ml. of acetic anhydride for 2.5 hours. The solution was evaporated and the crude product treated with water. 19 g. of 3-acetylamino-5-(2-furyl)-4-methyl-1,2,4-triazole was obtained. M.P. 217–220° C. (decomp.). (Found (percent): C, 52.2; H, 5.0; N, 27.1. Calc. for $C_9H_{10}N_4O_2$ (206.2) (percent): C, 52.4; H, 4.9; N, 27.2.)

(d) Preparation of 3-amino-4-methyl-5-(5-nitro-2-furyl)-1,2,4-triazole 5.4 g. (0.026 mole) of 3-acetylamino-4-methyl-5-(2-furyl)-1,2,4-triazole were dissolved in 20 ml. of concentrated sulphuric acid at 0° C. A cooled mixture of 2.6 ml. of concentrated nitric acid and 5.2 ml. of concentrated sulphuric acid was added in a dropwise manner during 45 min., the temperature being maintained at 0° C. The dark colored solution was poured out on ice to form a clear solution. The latter was neutralized with ammonia to precipitate 5.2 g. (79%) of 3-acetylamino-4-methyl-5-(5-nitro-2-furyl)-1,2,4-triazole. This substance melts at 264–272° C. with decomposition.

The acetyl group was dehydrolyzed by boiling the compound in 33 ml. of 2 N hydrochloric acid and 100 ml. of water for 1½ hours, thereby forming a clear solution. The latter was neutralized with ammonia to precipitate 3.1 g. of a flame-colored substance (72% calculated on the nitrated acetyl derivative). After recrystallization from a mixture of ethanol and dimethyl formamide, the substance was found to melt at 278.5–279.5° C. with decomposition.

EXAMPLE 2

(a) Preparation of 4-ethyl-3-ethylamino-5-(2-furyl)-1,2,4-triazole 25.5 g. (0.1 mole) of 1-amino-2,3-diethylguanidine hydroiodide and 13 g. (0.1 mole) of furoyl chloride were melted together at 100° C. for 35 min. The melt was cooled and recrystallized from acetonitrile. 19.8 g. of 2,3-diethyl-1-furoyl-aminoguanidine hydroiodide were obtained (M.P. 176–178° C.). This substance was cyclized by boiling in 60 ml. of 2 M sodium hydroxide for 1 hour. An oil precipitated which crystallized by cooling. The product was recrystallized from acetone giving 11.1 g. (54%) of 4-ethyl-3-ethylamino-5-(3-furyl)-1,2,4-triazole. M.P. 135.5–137.5° C. (Found (percent): C, 58.1; H, 7.1; N, 27.5. Calc. for $C_{10}H_{14}N_4O$ (206.1) (percent): C, 58.2; H, 6.9; N, 27.2.)

(b) Preparation of 3-acetylethylamino-4-ethyl-5-(2-furyl)-1,2,4-triazole 7.6 g. (0.037 mole) of 4-ethyl-3-ethylamino-5-(2-furyl)-1,2,4-triazole were boiled with 50 ml. of acetic anhydride for 1.5 hours. The solution was evaporated. The crude product was not purified but was immediately nitrated.

(c) Preparation of 4-ethyl-3-ethylamino-5-(5-nitro-2-furyl)-1,2,4-triazole 9.2 g. (0.037 mole) of 3-acetylethylamino-4-ethyl-5-(2-furyl)-1,2,4-triazole were dissolved in 29 ml. of conc. sulfuric acid. 3.4 ml. of conc. nitric acid were added in a dropwise manner to the sulfuric acid solution at −5 to −2° C. over a 30 minute period. The solution obtained was poured out on ice. 2.6 g. of solids precipitated. Upon neutralization of the acid solution another 3.8 g. of solids precipitated. The solids were combined and boiled with 20 ml. of 2 N hydrochloric acid for 1½ hours. Upon neutralization, 2.1 g. of 4-ethyl-3-ethylamino-5-(5-nitro-2-furyl)-1,2,4-triazole precipitated in the form of crystals melting at 183–186° C.

EXAMPLE 3

The following example illustrates an alternative method of synthesizing 3-amino-4-methyl-5-(5-nitro-2-furyl)-1,2,4-triazole.

2.43 ml. of conc. $HNO_3$ was added dropwise to 5 ml. of conc. $H_2SO_4$ at 0° C. This "nitration mixture" was added dropwise to a solution of 3-amino-4-methyl-5-(2-furyl)-1,2,4-triazole in 25 ml. of conc. $H_2SO_4$ at 0° C. The addition took 15 min. and the solution was stirred for another 45 min. and then poured on ice. The sulphate salt of 3-amino - 4 - methyl-5-(5-nitro-2-furyl)-1,2,4-triazole precipitated. The free base was obtained by dissolving the salt in 120 ml. of 2 M HCl and then neutralizing the solution with 5 M $NH_4OH$. 4.5 g. (71%) of 3-amino-4-methyl - 5 - (5-nitro-2-furyl)-1,2,4-triazole was obtained. M.P. 282–282.5° C. (decomp.).

The advantage of this method is that it gives a higher yield, a purer product and represents a simplified way of synthesis because no acetylation and deacetylation are required.

UTILITY

It has been discovered that the compounds of the Formula I possess a high order of therapeutic activity when administered to hosts infected with various pathogenic microorganisms at dosages causing no mainifestation of toxic effect.

The novel compounds of the Formula I may be used either as such or as non-toxic salts thereof with organic or inorganic bases for the combatting of infections. The compounds not substituted with an acyl group possess ampholytic properties and may be used also in the form of non-toxic salts with organic and inorganic acids.

The antimicrobial effect on different microorganims of one substance according to the invention is evident from the following table specifying the lowest concentration of the substance in micrograms per ml. of substrate causing a complete growth inhibition of some of the microorganisms. The following substance was tested:

3-amino-4-methyl-5-(5-nitro-2-furyl)-1,2,4-triazole

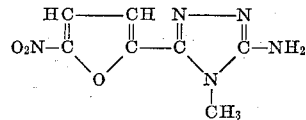

TABLE 1

| | |
|---|---|
| M. tuberculosis | 12.5 |
| Staphylococcus aureus | 6.3–12.5 |
| E. coli | 1.6 |

On oral application, the substances will be absorbed and excreted in the urine which makes them utilizible as urinary tract antiseptics. In Table 2 there is shown the diameter of the zones of inhibition obtained in coli-infected agar plates with urine from mice treated with the above substance in a dosage of 50 mg. per kg. of animal body weight.

The statements of time are the periods of time after treatment within which the samples of urine have been collected. The method used was the so-called cup-plate method which means that inhibition zones smaller than 8 mm. do not involve any anti-bacterial activity.

TABLE 2

Inhibition zone diameter in mm. obtained by urine collected after:

| | |
|---|---|
| 0–1 hour | 25 |
| 1–2 hours | 32 |
| 2–4 hours | 28 |
| 4–6 hours | 20 |

The compounding and formulating of the new compounds in dosage forms capable of ready administration is easily accomplished in accordance with accepted practice in the art. Tablets, suspensions, capsules and like dosage forms containing the new compounds in desired quantity can be readily prepared using excipients, adjuvants and carriers conventionally employed.

What we claim is:

1. A compound selected from the group consisting of compounds of the formula

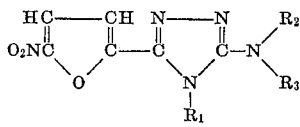

wherein $R_1$ represents lower alkyl; $R_2$ is a member selected from the group consisting of hydrogen and lower alkyl; and $R_3$ is a member selected from the group consisting of hydrogen, lower alkyl, and radicals of the formula —CO—$R_4$, wherein $R_4$ is a member selected from the group consisting of hydrogen, alkyl containing from 1 to 3 carbon atoms, and halogen-substituted alkyl containing from 1 to 3 carbon atoms, and therapeutically useful salts thereof.

2. 3 - amino - 4 - methyl-5-(5-nitro-2-furyl)-1,2,4-triazole.

3. 3 - acetylamino - 4 - methyl-5-(5-nitro-2-furyl)-1,2,4-triazole.

4. 4 - ethyl - 3 - ethylamino-5-(5-nitro-2-furyl)-1,2,4-triazole.

5. A therapeutically useful salt of the compound set forth in claim 2.

6. A therapeutically useful salt of the compound set forth in claim 3.

7. A therapeutically useful salt of the compound set forth in claim 4.

8. The compound of claim 1 wherein $R_1$ is a member selected from the group consisting of methyl, ethyl, n-propyl, and isopropyl.

9. The compound of claim 1 wherein $R_2$ and $R_3$ are hydrogen.

10. The compound of claim 1 wherein $R_3$ is a member selected from the group consisting of formyl, acetyl, propionyl, chloroacetyl, dichloroacetyl, 2-chloropropionyl, and bromoacetyl.

References Cited

UNITED STATES PATENTS 3,391,155  7/1968  Benjamin  260—308

FOREIGN PATENTS 1,040,551  9/1966  Great Britain  260—308

OTHER REFERENCES

Morton: The Chemistry of Heterocyclic Compounds (New York, 1946), p. 6.

Wagner et al.: Synthetic Organic Chemistry (New York, 1953), pp. 746–9.

ALTON D. ROLLINS, Primary Examiner

U.S. Cl. X.R.

260—347.3; 424—269